United States Patent [19]
Verbo et al.

[11] Patent Number: 5,890,358
[45] Date of Patent: Apr. 6, 1999

[54] MASTER CYLINDER WITH SHOCK DEFLECTOR INSERT

[75] Inventors: Ulysse Verbo, Aulnay-Sous-Bois; Alfonzo Valenzuela, Drancy, both of France

[73] Assignee: Bosch Systems De Freinage, Drancy, France

[21] Appl. No.: 849,593

[22] PCT Filed: May 14, 1997

[86] PCT No.: PCT/FR97/00853

§ 371 Date: May 28, 1997

§ 102(e) Date: May 28, 1997

[87] PCT Pub. No.: WO97/49589

PCT Pub. Date: Dec. 31, 1997

[30] Foreign Application Priority Data

Jun. 24, 1996 [FR] France .................................. 96 07794

[51] Int. Cl.$^6$ ............................. B60T 11/16; B60R 21/00
[52] U.S. Cl. ......................................................... 60/533
[58] Field of Search ..................................... 60/533

[56] References Cited

U.S. PATENT DOCUMENTS 4,823,553   4/1989   Reynolds ............................. 60/533 X

FOREIGN PATENT DOCUMENTS

| 492191 | 7/1992 | European Pat. Off. . |
| 2437337 | 4/1980 | France . |
| 2482547 | 11/1981 | France . |
| 2230493 | 10/1990 | United Kingdom ..................... 60/533 |

*Primary Examiner*—John E. Ryznic
*Attorney, Agent, or Firm*—Leo H. McCormick, Jr.; Warren Comstock

[57] ABSTRACT

A master cylinder comprising a cylindrical body (1) which points along a main axis (X). The cylindrical body (1) has a free end (11) and an attached end (12) with a piston rod (2) extending axially from the attached end (12). An impact deflector (3) removably mounted on the cylindrical body (1) covers the free end (11). The impact deflector (3) has at least one deflecting surface (D) which is inclined obliquely to the main axis (X).

7 Claims, 2 Drawing Sheets

MASTER CYLINDER WITH SHOCK DEFLECTOR INSERT

BACKGROUND OF THE INVENTION

The present invention relates to a master cylinder comprising a cylindrical body pointing along a main axis and having a free end, an attached end, and a piston rod projecting axially from the attached end.

In practice, all the master cylinders used in hydraulic braking systems for motor vehicles ever since the latter were invented correspond to this definition.

However, a tightening of safety standards has revealed a need to develop master cylinders in such a way that a frontal impact applied to the vehicle cannot be readily transmitted to the driver's leg by the master cylinder, even if the impact occurs while the driver is putting all of his weight on the brake pedal.

In order to achieve this, it is known practice, at least in some recent embodiments, for the master cylinder locally to be given a shape by virtue of which it can retract laterally when it receives an axial impact from a part of the engine which has been displaced by a frontal impact of the vehicle.

Such a solution does, however, have two major drawbacks.

On the one hand, insofar as the internal layout of the engine bay of a vehicle is practically specific to each vehicle, and as the most dangerous angle of impact on the master cylinder therefore varies from one vehicle to another, the known solution requires a master cylinder to be designed for each vehicle, and this leads to absolutely prohibitive development and manufacturing lead times and costs.

On the other hand, insofar as a master cylinder has to be manufactured from a metal which has physical properties which suit the conditions of manufacture, leaktightness and reliability with which a master cylinder has to comply, any excess of this metal with a view to fulfilling an impact-deflector function leads both to a substantial on-cost and to a risk of degrading the inherent performance of the master cylinder.

SUMMARY OF THE INVENTION

The present invention falls within this context, and its object is to propose a master cylinder which is free of such drawbacks.

To this end, the master cylinder of the present invention is essentially characterized in that it includes an attached impact deflector covering the free end of the body, mounted removably on the body and having at least one deflecting surface which is inclined obliquely to the main axis.

In one possible embodiment of the invention, the impact deflector has a front part, a rear part, and a lower rib, the front part covering the free end of the cylindrical body, the rear part being fitted with two opposed lugs which form a clamp gripping the attached end of the cylindrical body removably between them, and the lower rib linking the front and rear parts and having a height which increases progressively from the front part towards the rear part Furthermore, the lower rib preferably has at least one variation in slope, and may advantageously be delimited by an edge, at least one portion of which is not coplanar with the main axis of the master cylinder.

The front part of the impact deflector may itself be domed in order, at least in part, to constitute the deflecting surface, and it may be screwed to the body of the master cylinder to allow better transmission thereto of the forces of deformation which act in the event of an impact.

Further features and advantages of the invention will emerge clearly from the description thereof given hereafter by way of non-limiting example with reference to the attached figures, among which:

DETAILED DESCRIPTION OF THE INVENTION

Figure 1:
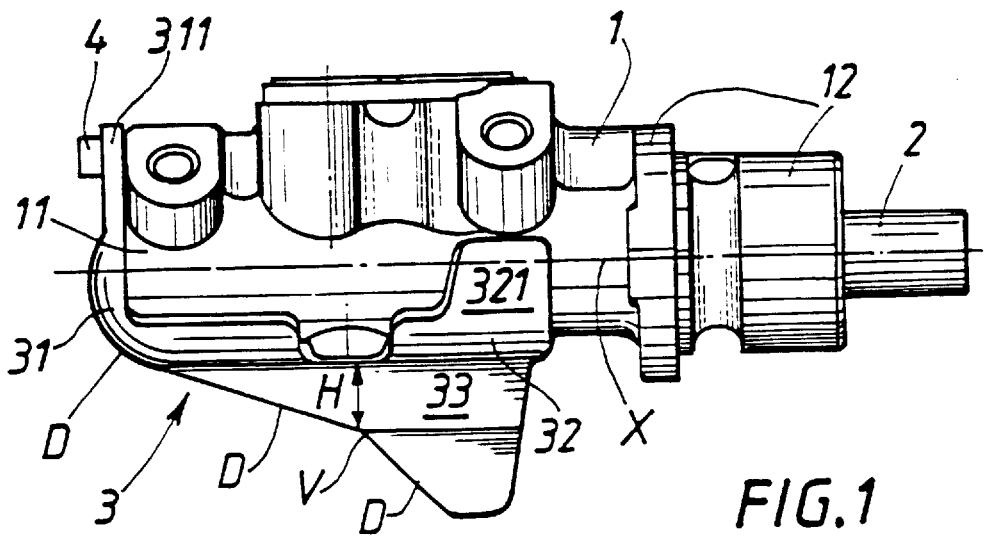
FIG. 1 is a face-on view of a master cylinder in accordance with the invention.
Figure 2:
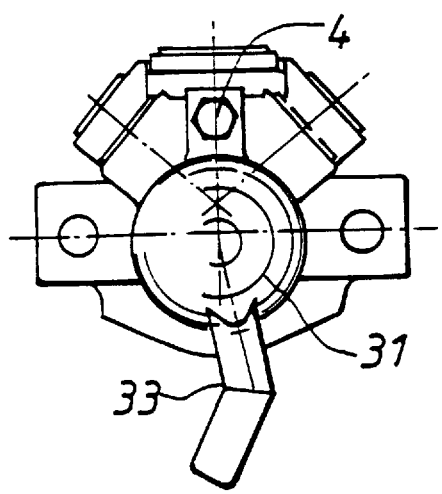
FIG. 2 is an end-on view of such a master cylinder, observed from its front part end.

As FIG. 1 shows, the invention relates to a master cylinder comprising a cylindrical body 1 pointing along a main axis X and having a free end 11, an attached end 12, and a piston rod 2 projecting axially from the attached end 12.

According to the invention, this master cylinder includes an attached impact deflector 3 covering the free end 11 of the body 1, mounted removably on the body 1 and having at least one deflecting surface D which is inclined obliquely to the main axis X.

In the embodiment illustrated, the impact deflector 3 has a front part 31, a rear part 32, and a lower rib 33, the front part 31 covering the free end 11 of the cylindrical body, the rear part 32 being fitted with two opposed lugs 321, 322 which form a clamp gripping the attached end 12 of the cylindrical body removably between them, and the lower rib 33 linking the front and rear parts and having a height H which increases progressively from the front part 31 towards the rear part 32.

As the figures show, the lower rib 33 may have at least one variation in slope V.

Figure 3:
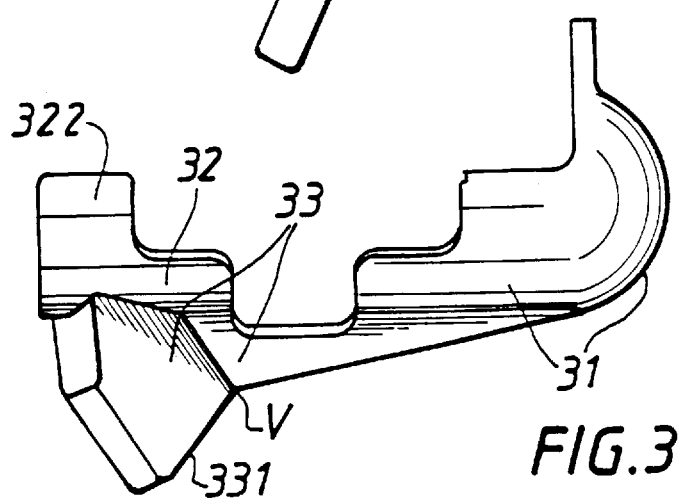
FIG. 3 is a face-on view of an impact deflector which can be used for a master cylinder in accordance with the invention.
Figure 4:
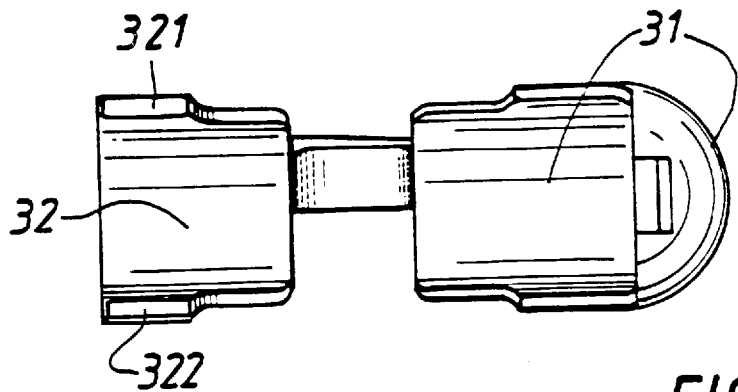
FIG. 4 is a view from above of the impact deflector of FIG. 3.
Figure 5:
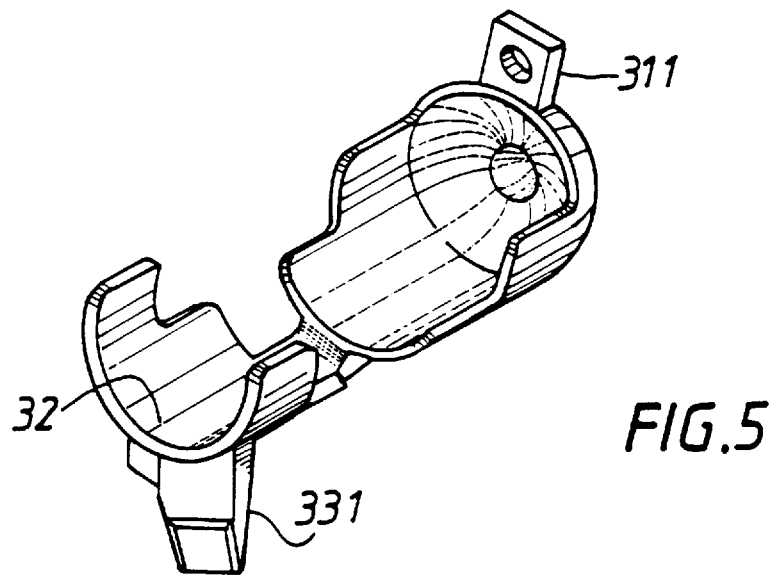
FIG. 5 is a perspective view of the impact deflector of FIG. 3, observed from its rear part end.
Figure 6:
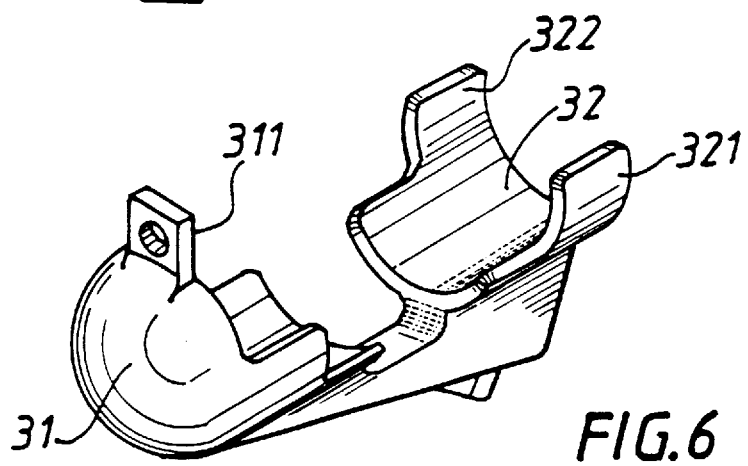
FIG. 6 is a perspective view of the impact deflector of FIG. 3, observed from its front part end.

Furthermore, as is the case of the deflector as represented in FIGS. 3 and 5, it is possible for a portion 331 at the edge of the lower rib 33 not to be coplanar with the main axis X, so as to allow a frontal impact to apply to the deflector a torsional force which is transmitted to the body 1 of the master cylinder or which retracts the deflector itself.

For greater safety, the front part 31 of the impact deflector 3 may be at least locally domed in order for itself to form a deflecting surface D.

Furthermore, the front part 31 of the impact deflector 3 may be rendered integral with the body 1 of the master cylinder by means of a screw 4 passing through a tab 311 of the front part of the deflector and engaged in the body 1 of the master cylinder.

What is claimed is:

1. A master cylinder comprising a cylindrical body pointing along a main axis and having a free end, an attached end, and a piston rod projecting axially from said attached end, characterized in that said master cylinder includes an attached impact deflector covering said free end of said cylindrical body, said impact deflector being mounted removably on said cylindrical body and having at least one deflecting surface which is inclined obliquely to said main axis.

2. The master cylinder according to claim 1, characterized in that said impact deflector has a front part, a rear part, and a lower rib, said front part covering said free end of said cylindrical body, said rear part being fitted with two opposed lugs which form a clamp which removably grips an attached end of said cylindrical body, and said lower rib linking said front and rear parts and having a height which increases progressively from said front part towards said rear part.

3. The master cylinder according to claim 2, characterized in that said lower rib has at least one variation in slope.

4. The master cylinder according to claim 2, characterized in that said lower rib is delimited by an edge, at least one portion of which is not coplanar with the said main axis.

5. The master cylinder according to claim 3, characterized in that said lower rib is delimited by an edge, at least one portion of which is not coplanar with the said main axis.

6. The master cylinder according to claim 3, characterized in that said front part of the impact deflector is domed.

7. The master cylinder according to claim 6, characterized in that said front part of the impact deflector is screwed to said cylindrical body of the master cylinder.

* * * * *